(12) United States Patent
Weyand et al.

(10) Patent No.: US 7,534,103 B2
(45) Date of Patent: May 19, 2009

(54) INJECTION MOLDING MACHINE

(75) Inventors: Stefan Weyand, Michelstadt (DE);
Hubert Degenbeck,
Postau/Oberkollnbach (DE); Rainer Schmidt, Altdorf (DE)

(73) Assignee: Landshuter Werkzeugbau Alfred Steinl GmbH & Co. KG, Altdorf (DE)

( * ) Notice: Subject to any disclaimer, the term of this patent is extended or adjusted under 35 U.S.C. 154(b) by 160 days.

(21) Appl. No.: 11/572,263
(22) PCT Filed: Jul. 21, 2005
(86) PCT No.: PCT/EP2005/007969
§ 371 (c)(1), (2), (4) Date: Jan. 18, 2007
(87) PCT Pub. No.: WO2006/008164
PCT Pub. Date: Jan. 26, 2006

(65) Prior Publication Data
US 2008/0042324 A1 Feb. 21, 2008

(30) Foreign Application Priority Data
Jul. 22, 2004 (DE) .......... 10 2004 035 553
Sep. 29, 2004 (DE) .......... 10 2004 047 347

(51) Int. Cl.
B29C 45/02 (2006.01)
(52) U.S. Cl. .......... 425/543; 425/544; 425/557; 425/561
(58) Field of Classification Search .......... 425/557, 425/558, 559, 560, 561, 543, 544
See application file for complete search history.

(56) References Cited
U.S. PATENT DOCUMENTS
2,227,263 A 12/1940 Knowles
2,359,840 A 10/1944 Goessling
2,478,013 A 8/1949 Roddy
(Continued)

FOREIGN PATENT DOCUMENTS
| DE | 6262 | 12/1959 |
| DE | 2201404 | 7/1973 |
| DE | 3612644 A1 | 10/1986 |
| EP | 0128840 | * 12/1984 |
| GB | 1 166 473 A | 10/1969 |

OTHER PUBLICATIONS
Johannaber, F.; Michaeli, W.: "Handbuch Spritzgiessen" 2001.
(Continued)

Primary Examiner—Tim Heitbrink
(74) Attorney, Agent, or Firm—William Greener; Bond, Schoeneck & King, PLLC

(57) ABSTRACT

Embodiments of the present invention relates to an injection moulding machine or injection unit and to an injection moulding method for injection moulding plastic materials (e.g., elastomeric materials), particularly according, to cold channel and hot channel techniques, comprising an extruder, a first piston/cylinder unit and a second piston/cylinder unit mounted in series thereto. The cylinder of the first piston/cylinder unit leads into the end of the second piston/cylinder unit located at a distance from an injection mould to be filled. According to an aspect of the invention, the elastomeric material is firstly led by means of the first piston/cylinder unit through the cylinder of the second piston/cylinder unit and into the injection mould, wherein the piston of the second piston/cylinder unit frees the flow path to the injection mould. Afterwards, the piston of the second piston/cylinder unit is displaced into the corresponding cylinder in order to introduce the elastomeric material located inside the second cylinder into the injection mould. The piston is retracted once the elastomeric material has been vulcanised on the cold channel nozzles.

13 Claims, 6 Drawing Sheets

U.S. PATENT DOCUMENTS

| | | | |
|---|---|---|---|
| 2,881,477 A | | 4/1959 | Giuseppe |
| 3,516,123 A | * | 6/1970 | Lang et al. ............... 425/588 |
| 3,989,793 A | | 11/1976 | Hertel et al. |
| 4,334,847 A | * | 6/1982 | Schauffele .............. 425/543 |
| 4,720,364 A | * | 1/1988 | Kauffman et al. .......... 425/543 |
| 5,277,567 A | * | 1/1994 | Bauer et al. ............. 425/544 |

OTHER PUBLICATIONS

Patent Abstracts of Japan vol. 008, No. 191 (M-322), Sep. 4, 1984-&; JP 59 081144 A (Mitsubishi Jukogyo KK), May 10, 1984.

Lauhus, W.P.: :Spritzgiessmaschinen fur Elastomere, Kunststoffe, 1999.

* cited by examiner

INJECTION MOLDING MACHINE

CROSS REFERENCE TO RELATED APPLICATION

This application is the US national stage filing of PCT/EP2005/007969 filed on Jul. 21, 2005, which claims priority to DE 10 2004 035 553.3 filed on Jul. 22, 2004 and to DE 10 2004 047 347.1 filed on Sep. 29, 2004.

BACKGROUND OF THE INVENTION

1. Field of the Invention

Embodiments of the present invention relates to an injection moulding machine, in particular an injection unit and a method for injection moulding plastic materials, in particular elastomers or caoutchouc material, according to cold channel and hot channel techniques.

2. Description of Related Art

Usually, according to the cold channel technique, several injection-moulded products are made simultaneously in one injection moulding process, wherein the caoutchouc material is led through a cold channel block in which individual channels extend to several cavities in a mould for the respective injection-moulded products. Before opening the mould, the injection piston of the injection moulding machine has to be retracted in order to relieve pressure from the cold channel, wherein the relatively long channels make the backflow of the material more difficult. Furthermore, known injection moulding machines are disadvantageous in that often waste material remains in the injection tube channel after the injection.

It is often the case with hot channel methods that the material remains at the wall of the injection tube channel and the machine nozzle in the form of a tube and the new material is passed through this tube. At high shear rate, the tube consisting of vulcanised material may come off and block the machine nozzle and the runner system. Thus, in order to ensure a complete emptying of the injection tube, in practice, a short "pre-ejection process" has to take place before.

DE 7 236 994 U1 discloses an injection moulding machine comprising a plastifying and injection unit having an injection cylinder and an injection piston positioned movably therein. The entire plastifying and injection unit is supported axially movably by means of the hydraulic cylinder. The injection piston is connected to two pistons arranged on both sides and supported in hydraulic cylinders of the injection cylinder in an axially movable manner. Moreover, the injection piston is formed as cylinder in which a plastifying screw is rotatably supported. The plastifying screw is, together with a motor, slightly axially movable relative to the injection piston via dynamic pressure cylinders in which pistons of the injection piston immerse.

DE 19 17 975 A1 discloses an injection moulding apparatus, wherein during plastification of the injection material introduced through a hopper into a plastifying cylinder, the screw is rotated by means of a motor via a gear. The discharge pressure thereby produced in the cylinder causes the screw to move axially rearwardly until it reaches its rear end position, in which the head of the screw is removed from the valve seat and consequently allows the plastified injection material the passing from the cylinder via the supply channel and a branch of the injection channel into the cavity of the cylinder which is increasing by simultaneous return of the piston. When the desired amount of injection material is in the cylinder, the injection process can be carried out.

DE 195 38 255 C2 relates to an injection moulding unit, wherein the piston feeds the plastified plastic material into an injection chamber while a piston provided in the injection chamber reverses.

SUMMARY

It is an object of an embodiment of the present invention to provide an improved injection unit and an improved injection moulding method, wherein the disadvantages of the prior art are avoided and in particular shorter cycle times and high injection pressures at the nozzle outlet are rendered possible also at great injection volume. This object is achieved with the injection unit defined in the claims and the claimed injection moulding method.

An embodiment of the invention is based on the concept to provide at the injection moulding machine a first piston/cylinder unit and second piston/cylinder unit mounted in series thereto. The cylinder of the first piston/cylinder unit leads into the end of the second piston/cylinder unit located at a distance from an injection mould to be filled. The second piston/cylinder unit replaces the injection tube if present. Unlike in a common injection unit, the injection tube or the second cylinder unit is completely emptied with the piston of the second piston/cylinder unit. Thus, pressure drops and undesired material remainders in the injection tube are avoided. The injection unit of the invention for injection moulding caoutchouc materials is in particular appropriate for the cold channel technique, but also for hot channel injection moulding methods.

According to an aspect, an injection unit comprises an extruder, a first piston/cylinder unit and a second piston/cylinder unit mounted in series thereto. The first piston/cylinder unit is adapted to lead elastomeric material through the cylinder of the second piston/cylinder unit into the injection mould. According to the arrangement of the embodied invention, the second piston/cylinder unit replaces the usually present injection tube to ensure that no plastic material remainders remain in the injection tube. Thus, in particular injection moulding elastomeric materials involves the advantage that also at temperatures of the second piston/cylinder unit (in particular at the end of the second piston/cylinder unit facing the mould) beyond the temperature limit where a vulcanisation of the elastomeric material takes place (approx. 120° C.), the injection moulding machine can be operated and thus shorter injection cycles are achieved. The second piston/cylinder unit is preferably adapted such that the elastomeric material can be introduced into the injection mould under higher pressure than with the first piston/cylinder unit alone.

According to a particular embodiment, the two piston/cylinder units are basically perpendicular, wherein preferably the first piston/cylinder unit is essentially horizontal and the second piston/cylinder unit is essentially vertical. The two piston/cylinder units are preferably connected to each other by a diverting element. The cylinder of the second piston/cylinder unit is preferably prolonged through the diverting element. The piston of the second piston/cylinder unit extends preferably through the diverting element. The piston of the second piston/cylinder unit has at least two portions greater in diameter and a portion therebetween smaller in diameter. The portions of greater diameter are also called piston skirts. The diameter of the piston skirts basically corresponds to the diameter of the cylinder of the second piston/cylinder unit.

In a further aspect, the injection moulding machine of the invention is provided with a blow/suction unit, which is connected to at least one of the piston/cylinder units. The blow/ suction unit is provided at the diverting element, opposite to the first piston/cylinder unit. By means of the blow/suction unit, the cylinder chamber of at least the second piston/cylinder unit can be evacuated prior to injection and the suction connection of the blow/suction unit can be cleaned after the injection. To this end, a plunger for ejecting material remainders from the suction connection is provided, wherein simultaneously or with a delay the ejected material remainders are blown out from the second piston/cylinder unit by means of the blow/suction unit.

The extruder of the injection moulding device according to an embodiment of the invention may be arranged in the first piston/cylinder unit; however, it is also possible to realise the extruder and the first piston/cylinder unit in the form of two separate arrangements.

According to the injection moulding method embodiment of the invention, at first the plastic material (e.g., elastomeric material) is led into an injection mould by means of a first piston/cylinder unit comprising a first piston and a first cylinder, wherein the elastomeric material is led through a second cylinder of a second piston/cylinder unit. The cylinder of the first piston/cylinder unit leads into the end of the second piston/cylinder unit located at a distance from the injection mould. Thus, the second piston frees the flow path to the injection mould. Afterwards, the second piston is moved in the second cylinder in order to introduce the elastomeric material located in the second cylinder into the injection mould. In an aspect, the elastomeric material is introduced into the injection mould by the second piston/cylinder unit under higher pressure than it would be possible by the first piston/cylinder unit alone. The operating pressure of the first piston/cylinder unit is, e.g., approximately in the range between 1,500 and 1,800 bar, whereas the pressure of the piston of the second piston/cylinder unit can be up to 2,500 bar.

Subsequently, the second piston is retracted. Thus, the pressure in the cold channel block can be released in the cold channel method, i.e., the material flows back through the nozzle into the cylinder chamber of the piston/cylinder unit.

According to an embodiment of the injection moulding method of the invention, the cylinder chamber of the piston/cylinder unit(s), in particular of the second piston/cylinder unit, is evacuated by means of a blow/suction unit prior to the supply of the plastic material (elastomeric material). To this end, the second piston is moved out from the second cylinder so far that at least the cylinder chamber of the second piston/cylinder units as well as the channels in the diverting element and the mould can be evacuated. After evacuation the second piston moves into the second cylinder to the extent that it closes the suction connection of the blow/suction unit in order to maintain the evacuated condition for supplying the plastic material.

Further, the blow/suction unit can assume a cleaning function, i.e., the suction connection of the blow/suction unit can be freed from material remainders, e.g., by a plunger. These material remainders may then be removed from the cylinder chambers by blowing out; to this end the second piston is moved out from the second cylinder.

According to the hot channel technique, it is further possible to further heat the material or to adjust it to a predetermined desired temperature via an adjustable or controllable throttle in the diverting element and to achieve a shorter heating/cycle time by the higher starting temperature. This further temperature increase is readily possible since the cylinder of the second piston/cylinder unit is subsequently completely emptied and no material can be vulcanised in the cylinder.

In the following, particular embodiments of the injection moulding machine and the injection moulding method of the invention are exemplarily described with the drawings.

DETAILED DESCRIPTION OF AN EMBODIMENT OF THE INVENTION

Figure 1:
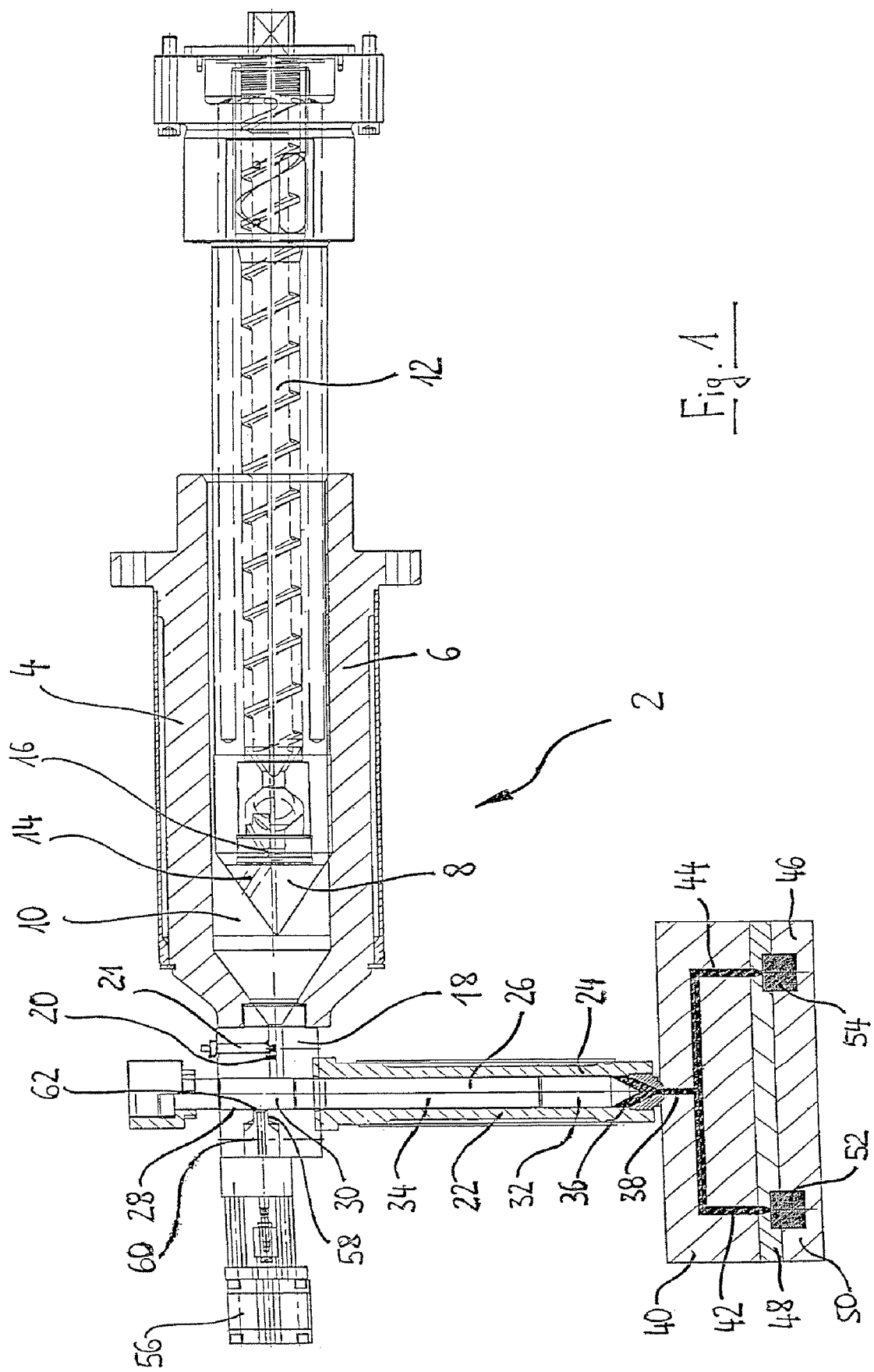
FIG. 1 is a schematic side view in partial section of an injection unit according to an embodiment of the invention.

The injection unit 2, schematically shown in side view in FIG. 1, has a first piston/cylinder unit 4 comprising a first cylinder 6 and a first piston 8. The cylinder 6 and the piston 8 form a first cylinder chamber 10 in which plastic material, in particular elastomeric material, can be introduced by means of an extruder 12 positioned in the piston 8. The piston 8 has at least one passageway 14, preferably three passageways, through which the plastic material plasticized by the extruder 12 can flow when a discharge valve 16 is open.

The cylinder chamber 10 of the first piston/cylinder unit 4 leads into a diverting element or piece 18, in which a channel 20 and a throttle 21 whose flow cross-section is adjustable or controllable are provided. The throttle 21 is designed, e.g., in form of a slide elliptical in cross-section. The throttle 21 can be further or alternatively coupled to a temperature adjustment in order to adjust an optimum operating temperature of the plastic material.

Further, a second piston/cylinder unit 22 is provided at the diverting element 18, the unit 22 comprising a second cylinder 24 and a second piston 26. The second piston 26 extends through a further channel 28 of the connecting element 18, wherein the two channels 20 and 28 are connected. The piston 26 of the second piston/cylinder unit 22 preferably has two piston skirts 30, 32 of greater diameter as well as a portion 34 of smaller diameter therebetween. The second piston/cylinder unit 22, along with its cylinder 24 and piston 26, defines a second cylinder chamber 36, which is filled with elastomeric material 38 in the operating condition as shown in FIG. 1. The cylinder 24 of the second piston/cylinder unit 22 is connected in series with its end, shown in the drawings at the top, i.e., with its upstream end facing the first piston/cylinder unit 4, to the first piston/cylinder unit 4.

The elastomeric material 38 flows through hot channels (not shown) or, as shown in FIG. 1, through a cold channel block 40 provided with several flow channels 42, 44 in order to lead the elastomeric material 38 to the injection mould 46.

The injection mould 46 consists of an upper mould half 48 and a lower mould half 50 defining together several mould cavities 52, 54.

The injection unit 2 of the invention further comprises a blow/suction unit 56 arranged at the connecting element 18 opposite to the first piston/cylinder unit 4. The blow/suction unit 56 is connected to the cylinder chambers 10 and 36 via a further channel 58 in the connecting element 18. The blow/suction unit 56 is suitable to evacuate the cylinder chamber 36 and the channel 28 in the connecting element 18. The blow/suction unit 56 further comprises a plunger 60 for closing the suction opening 62.

Referring to FIGS. 2 to 5, an injection cycle with the injection moulding machine of the invention is subsequently explained in more detail. For the sake of clarity, the first piston/cylinder unit is omitted in these Figures. According to FIG. 2, the plastic material 38 is led, by means of the first piston 8 of the first piston/cylinder unit 4, through the channel 20 of the connecting element 18 into the cylinder chamber 36 of the second cylinder 24 of the second piston/cylinder unit 22. To this end the second piston 26 is moved out from the cylinder chamber 36 along the arrow direction 62 to the extent that an end portion 64 of the second piston frees the connection between the two cylinder chambers 10 and 36 via the channel 20. The piston skirt 32 larger in diameter seals the cylinder chamber 36 to the top and the channel 58 in the connecting element 18 to the side. Thus, when moving forward the piston 8 of the first piston/cylinder unit 4, the elastomeric material 38 is fed through the cylinder chamber 36 into the channels 42, 44 of the cold channel block 40 and into the mould cavities 52, 54 until the cylinder chamber 10 is completely emptied. As shown, the mould cavities 52, 54 are already largely filled.

Figure 3:
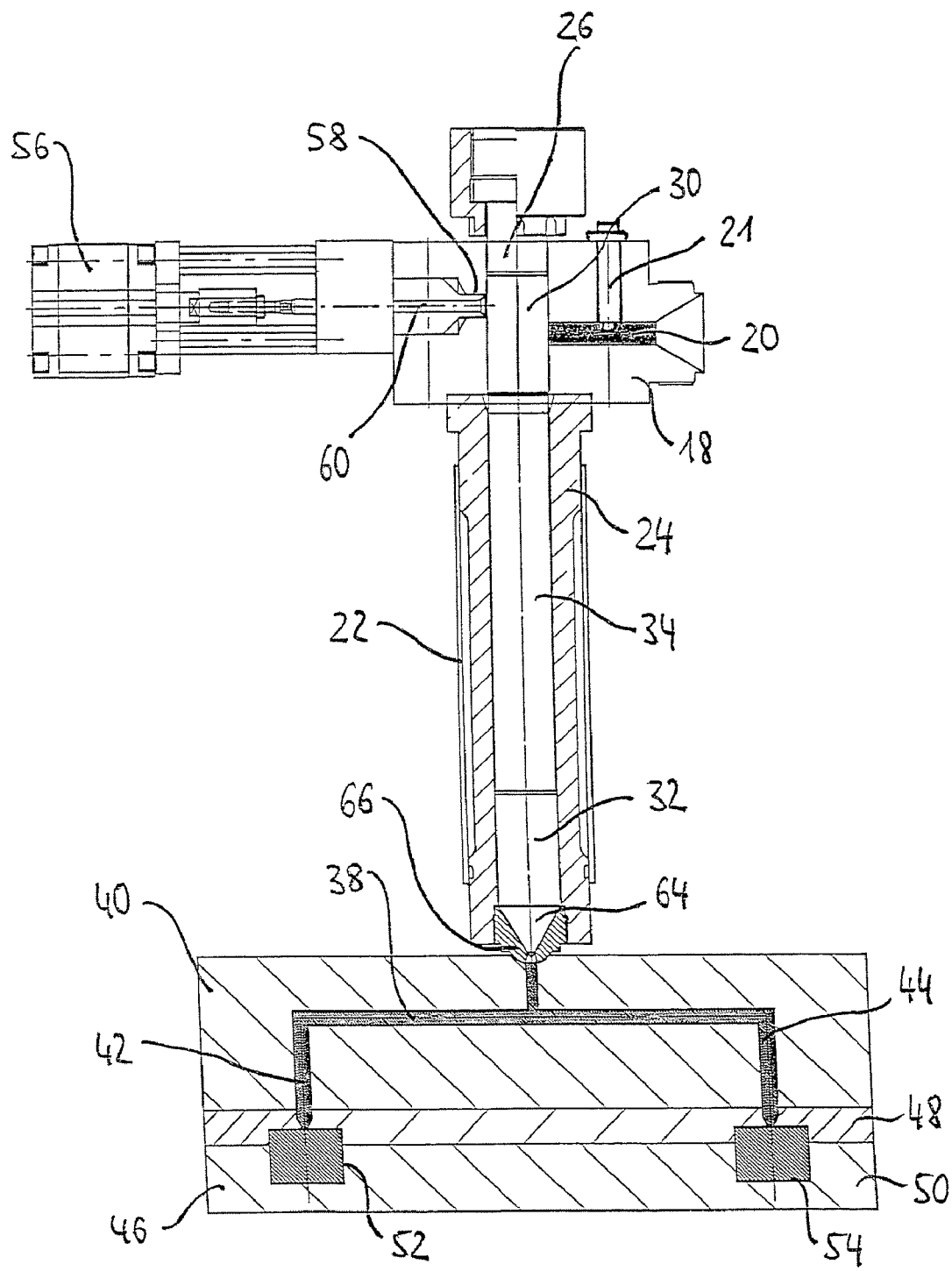
FIG. 3 is a side view similar to FIG. 2, wherein the second piston of the second piston/cylinder unit is moved in order to introduce the elastomeric material under high pressure into the injection mould and to completely empty the cylinder of the second piston/cylinder unit.

As shown in FIG. 3, the second piston/cylinder unit 22 is subsequently activated by moving the piston 26 into the cylinder 24 in order to inject the elastomeric material 38 of the cylinder chamber 36 into the mould 46 and to completely fill the mould cavities 52, 54. Since the diameter of the second piston 26 of the second piston/cylinder unit 22 is smaller than the diameter of the piston 8 of the first piston/cylinder unit 4, greater pressures can be realised with relatively little effort with the injection moulding machine according to the invention (e.g., up to 2,500 bar) than with common injection moulding machines. In the position of the second piston/cylinder unit 22 shown in FIG. 3, the upper piston skirt 30 seals both the channel 20 to the cylinder chamber 10 and the channel 58 to the blow/suction unit 56. The lower piston skirt 32 with the end portion 64 tightly seals the opening 66 of the cold channel block 40. The portion 34 smaller in diameter positioned between the two piston skirts 30, 32 allows a shifting of the piston 26 with relatively low friction resistance.

Figure 4:
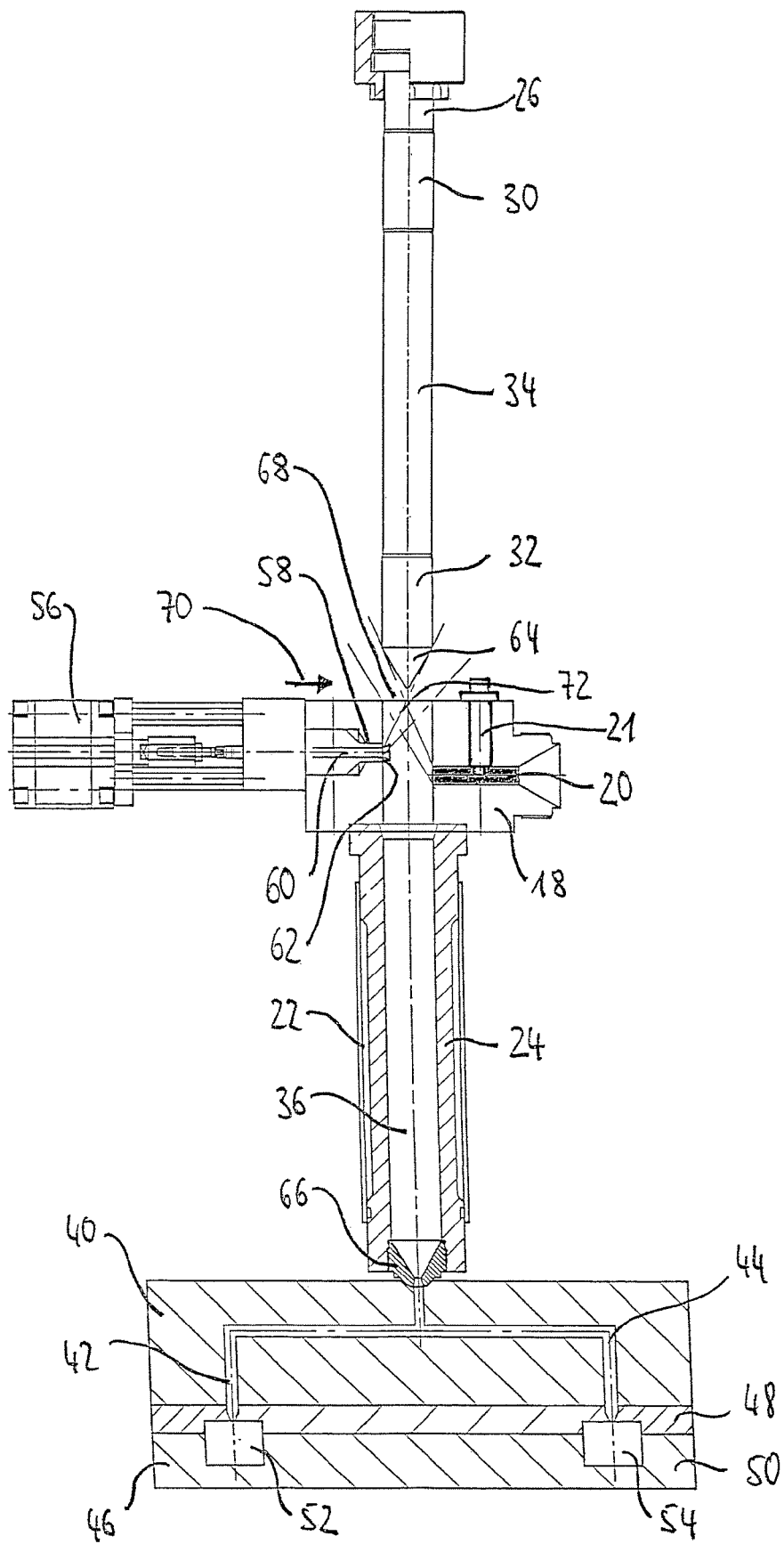
FIG. 4 is a further side view similar to FIGS. 2 and 3, wherein the second piston is completely moved out from the second cylinder, and the blow/suction unit blows the vacuum connection free (optional)

Once the mould has been filled, the piston 26 of the second piston/cylinder unit 22 is essentially completely moved out from the cylinder chamber 36 in the blow position shown in FIG. 4, preferably after a certain time for releasing the pressure so that the cylinder chamber 36 is open to the top in order to provide an exhaust opening 68. The plunger 60 of the blow/suction unit 56 moves into the cylinder chamber 36 in the direction indicated by the arrow 70 to remove material remainders from the suction connection 62. Simultaneously or with a delay, the blow/suction 56 supplies blast air through the channel 58 in order to facilitate the removal of the material remainders and to blow the removed material remainders through the opening 68, as is shown by the lines 72 in FIG. 4.

Before the piston 26 is moved out from the cylinder 24 of the second piston/cylinder unit 22, it can be suitable to retract the first piston 8 of the first piston/cylinder unit 4 to reduce the pressure on the piston 26.

Figure 2:
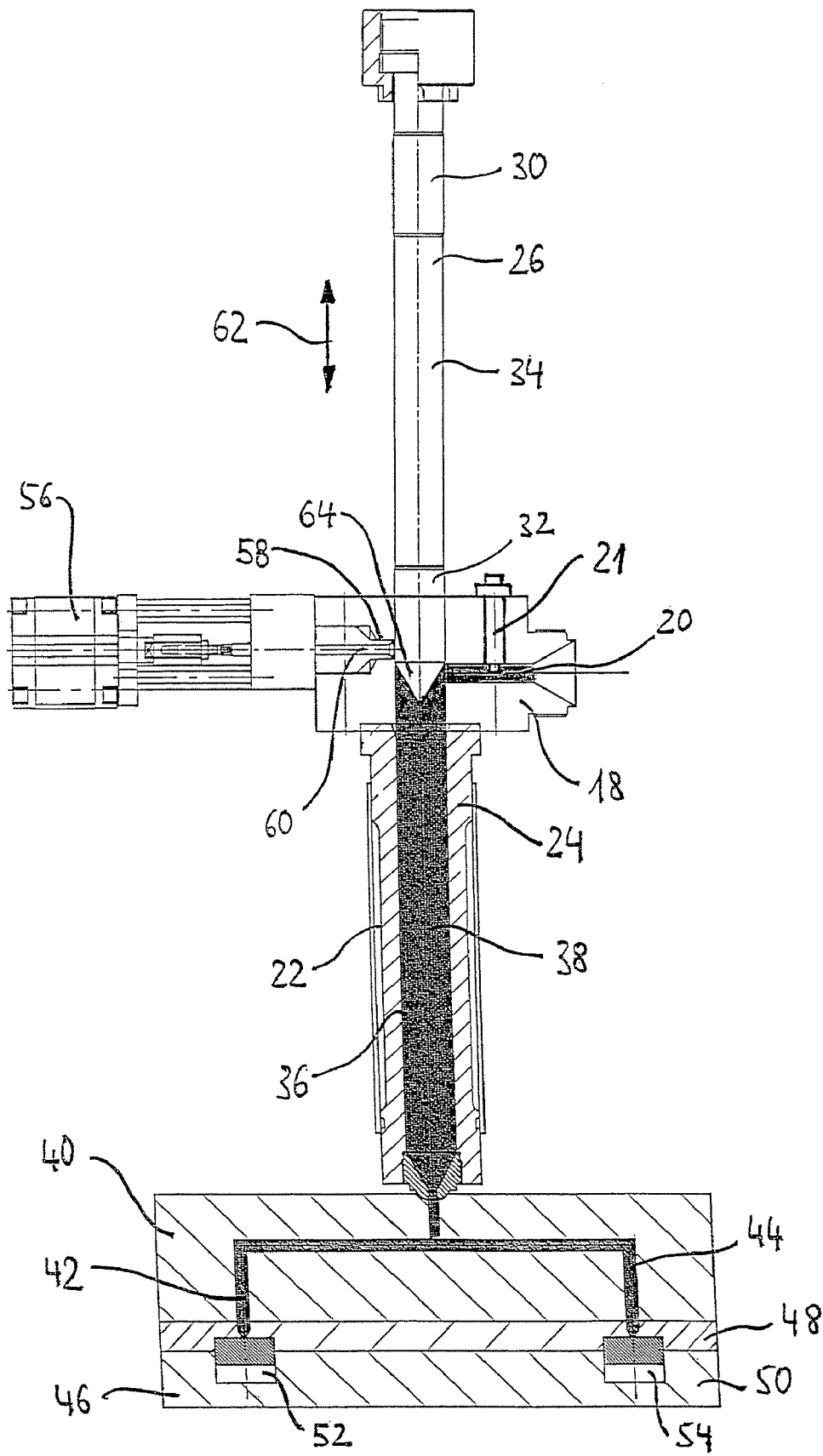
FIG. 2 is a partial sectional side view of a part of the injection moulding machine of the invention during the supply of the elastomeric material into the injection mould.
Figure 5:
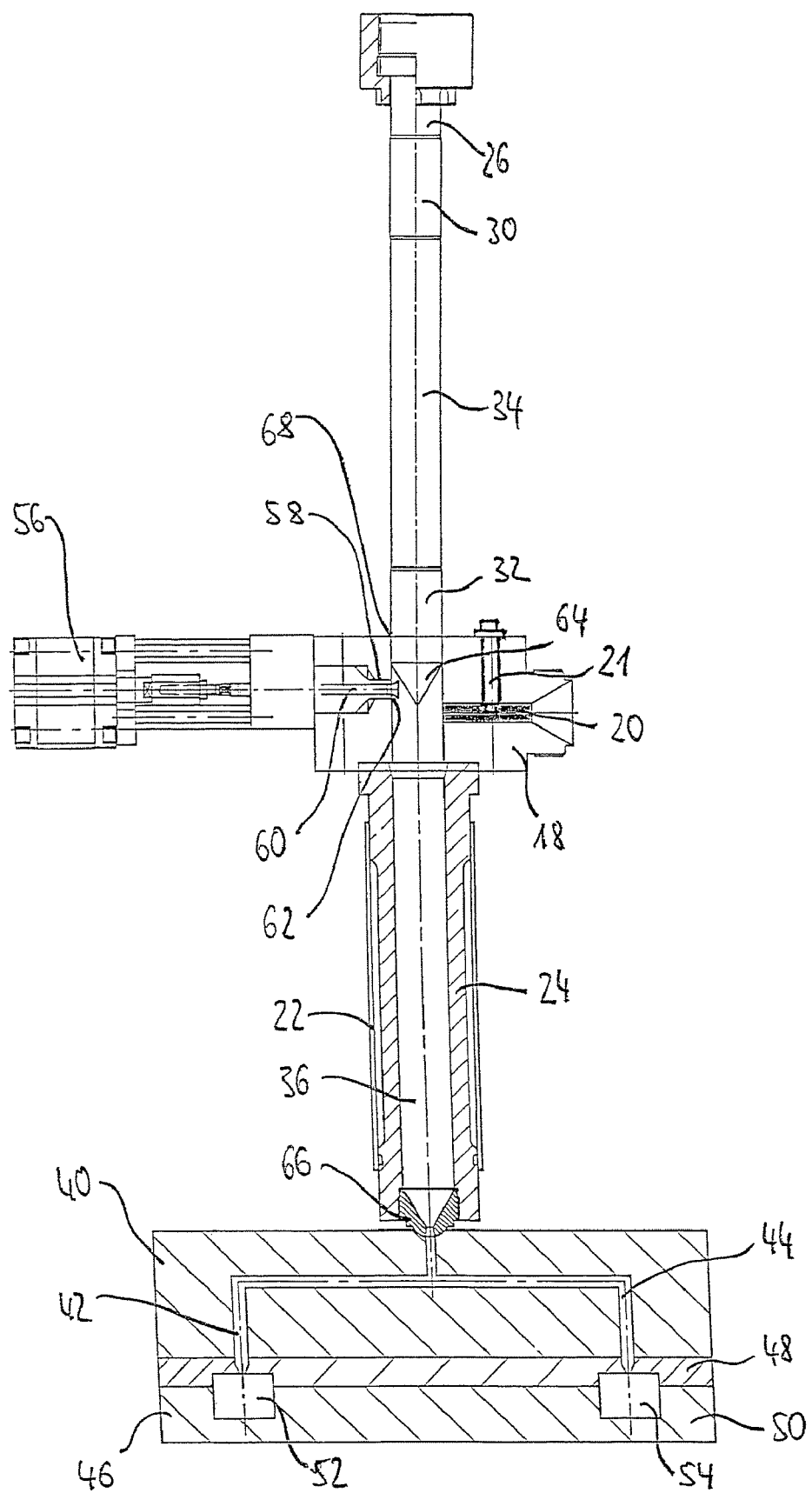
FIG. 5 is a view similar to FIGS. 2 to 4, wherein the second piston is moved into the second cylinder to an extent so as to enable an evacuation of the cylinder cavity of the piston/cylinder unit(s) as well as the mould channels and cavities.

Afterwards, the piston 26 is moved into the cylinder chamber 36 to the suction position as shown in FIG. 5 so that the lower piston skirt 32 seals the opening 68. The channel 20 to the first cylinder chamber 10 as well as the channel 58 to the blow/suction unit 56 remain open so that the blow/suction unit 56 can evacuate the cavities 36 of the second piston/cylinder units 22 and the channels 20, 58 of the connecting element 18 by generating a vacuum. Thus, it is achieved that no air is present in the cavities of the device and reaches the mould when the caoutchouc material is injected. Following the suction position shown in FIG. 5, the piston further moves into the cylinder chamber 36 to close the channel 58 as shown in FIG. 2 so that a new injection cycle can start.

Figure 6:
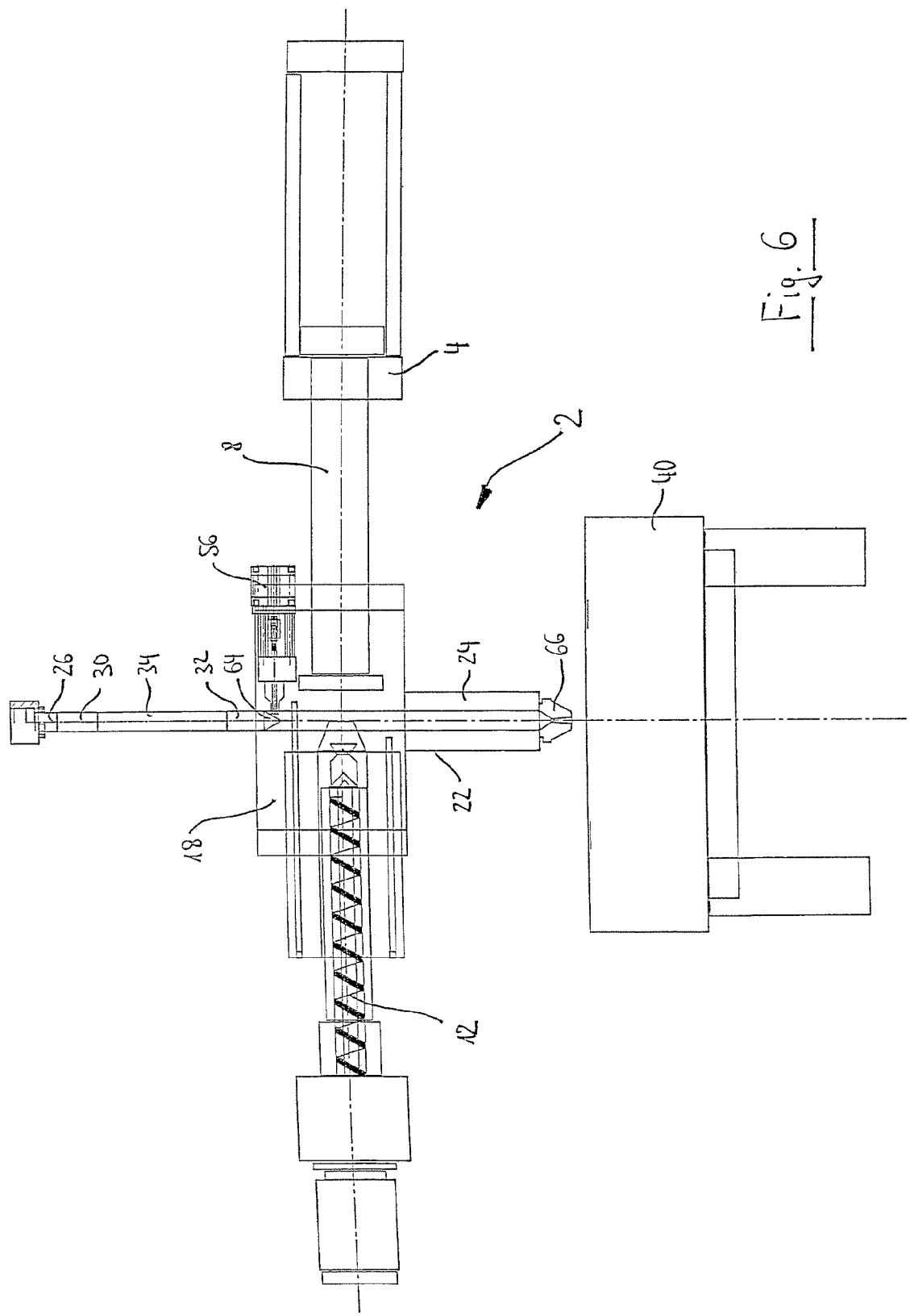
FIG. 6 is a schematic side view of a second embodiment of an injection unit according to the invention.

FIG. 6 shows an alternative embodiment of the injection moulding machine of the invention, which basically operates according to the same principle. In this embodiment, the extruder 12 and the first piston/cylinder unit 4 are formed as separate arrangements. Accordingly, the extruder 12 provides the plasticized elastomeric material and introduces it into the connecting element 18 and the cylinder chamber of the first piston/cylinder unit 4. The first piston 8 then leads the plastic material to the injection mould and the second piston 26 feeds the plastic material completely into the injection mould and provides the pressure required for the injection moulding. The mode of operation is identical to the mode of operation described above for the injection unit according to the first embodiment.

According to a method embodiment of the invention, the filling of the injection mould takes place in two phases, i.e., a first phase, in which the first piston cylinder unit 4 conveys the material through the second piston/cylinder unit, and in a second phase in which the second piston/cylinder unit feeds the remainder of the material completely into the mould under sufficient pressure. During the first phase, a speed control takes place, i.e., a control of the volume flow of the plastic material while in the second phase, a pressure control takes place. To this end the use of a position measurement system at the first and/or second piston/cylinder unit can be advantageous as well as corresponding pressure and/or temperature sensors in the area of the cavity 10 and the channel 20.

The first phase can be simultaneously coupled to a control of the mass temperature. To this end, at constant volume flow, the effective flow cross-section of the channel 20 is changed via an adjustable throttle 21 such that the elastomeric material is heated to a predetermined temperature by heat dissipated by friction in this channel. This can be controlled either by adjusting a predetermined pressure difference or by measuring the temperature before and after the actuator 21.

According to a particular aspect of the injection moulding method of the invention, adding an amount of a new mixture after the injection of the plastic material is possible without (substantial) delay (of the so-called holding pressure time). The adding takes place with the first piston/cylinder unit 4 in the position of the piston of the second piston/cylinder unit 22 of FIG. 3. Furthermore, in the hot channel technique, the evacuation of the mould is possible via the injection unit, i.e., no mould vacuum, no vacuum chamber or no vacuum bell jar is necessary. Moreover, in the injection moulding machine or unit according to the invention, considerably smaller through holes in the upper pressure plate call be realised, wherein a smaller bending up of the plate can be obtained.

We claim:

1. An injection moulding machine for injection moulding caoutchouc materials according to cold channel and hot channel techniques comprising an extruder, a first piston/cylinder unit and a second piston/cylinder unit mounted in series, wherein the cylinder of the first piston/cylinder unit leads into the end of the second piston/cylinder unit located at a distance from an injection mould to be filled, wherein the second piston/cylinder unit is adapted such that the piston of the second piston/cylinder unit essentially completely empties the cylinder of the second piston/cylinder unit, and wherein a throttle of variable cross-section for adjusting the temperature of the caoutchouc material is provided in the flow path between the two piston/cylinder units.

2. The injection moulding machine according to claim 1, wherein the first piston/cylinder unit is adapted to lead caoutchouc material through the cylinder of the second piston/cylinder unit into an injection mould, and wherein the second piston/cylinder unit is adapted to feed the caoutchouc material into the injection mould under higher pressure than by means of the first piston/cylinder unit alone.

3. The injection moulding machine according to claim 1, wherein the two piston/cylinder units are arranged basically perpendicularly to each other.

4. The injection moulding machine according to claim 1, wherein the two piston/cylinder units are connected to each other by a diverting element.

5. The injection moulding machine according to claim 1, wherein the cylinder and the piston of the second piston/cylinder unit extend through the diverting element.

6. The injection moulding machine according to claim 4, wherein the diverting element comprises the throttle and is one of mechanically adjustable, electrically actuated, hydraulically actuated and pneumatically actuated.

7. The injection moulding machine according to claim 5, wherein the piston of the second piston/cylinder unit has at least two portions of greater diameter and a portion of smaller diameter therebetween, wherein the diameter of the portions of greater diameter essentially corresponds to the diameter of the cylinder of the second piston/cylinder unit.

8. The injection moulding machine according to claim 1, comprising a blow/suction unit connected to at least one of the piston/cylinder units.

9. The injection moulding machine according to claim 8, wherein the blow/suction unit is provided at the diverting element opposite to the first piston/cylinder unit.

10. The injection moulding machine according to claim 8, wherein the blow/suction unit is formed to evacuate the cylinder chamber of the piston/cylinder unit(s) which is empty prior to the injection and, after injection, to clean at least the suction connection of the blow/suction unit by blowing.

11. The injection moulding machine according to claim 10, wherein the blow/suction unit has a plunger for sealing the suction connection.

12. The injection moulding machine according to claim 1, wherein the extruder is arranged in the first piston/cylinder unit.

13. The injection moulding machine according to claim 1, wherein the first piston/cylinder unit is essentially horizontal and the second piston/cylinder unit is essentially vertical.

* * * * *